United States Patent
Frick et al.

[15] 3,673,209
[45] June 27, 1972

[54] BIOCIDALLY ACTIVE BENZIMIDAZOLE COMPOUNDS

[72] Inventors: Wilhelm Ernst Frick, Baselland; Anton G. Weiss, Basel; Thomas Wenger; Walter Traber, both of Riehen, all of Switzerland

[73] Assignee: Geigy Chemical Corporation, Ardsley, N.Y.

[22] Filed: June 30, 1969

[21] Appl. No.: 851,524

Related U.S. Application Data

[62] Division of Ser. No. 570,159, Aug. 4, 1966, Pat. No. 3,506,767.

[30] Foreign Application Priority Data

Aug. 6, 1965    Switzerland .......................... 11111/65
Nov. 11, 1965    Switzerland .......................... 11586/65
Jan. 5, 1966    Switzerland .............................. 103/66

[52] U.S. Cl. ................... 260/309.2, 260/571, 260/578, 260/580, 260/240 E, 252/8.57, 252/8.8
[51] Int. Cl. .............................................. C07d 49/38
[58] Field of Search .......................................... 260/309.2

[56] References Cited

UNITED STATES PATENTS 3,265,706   8/1966   Gal et al. ........................... 260/309.2
3,531,495   9/1970   Burton et al. ...................... 260/309.2

*Primary Examiner*—Henry R. Jiles
*Assistant Examiner*—S. D. Winters
*Attorney*—Karl F. Jorda, Edward A. Hedman and Martin J. Spellman

[57] ABSTRACT

New benzimidazole compounds are disclosed which have biocidal activity. The compounds have the following structures:

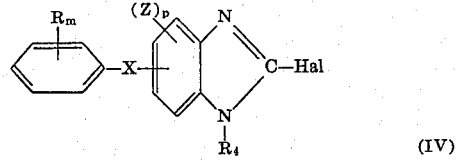

(IV)

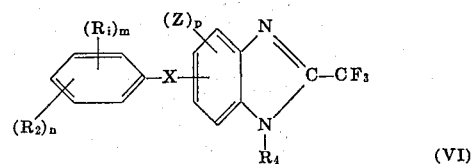

(VI)

wherein R is hydrogen, halogen or trifluoromethyl; $R_1$ is fluorine, chlorine, bromine or halogeno lower alkyl; $R_2$ is fluorine, chlorine, bromine, lower alkyl, lower alkoxy, lower alkylthio, lower alkylsulfinyl or lower alkyl sulfonyl; $R_4$ is hydrogen or an alkali metal cation; X is oxygen, sulfur, sulfinyl or sulfonyl; Z in formula IV is halogen, nitro, $C_{1-6}$ alkyl, $C_{1-6}$ alkoxy, $C_{1-6}$ alkylthio, trifluoromethyl, lower alkylamino, benzoylamino, halogenobenzoylamino, trifluoromethylbenzoylamino, benzenesulfonylamino, alkylsulfonylamino, alkylsulfinyl, alkylsulfonyl, trifluoromethylbenzenesulfonylamino, trifluoromethylhalogenobenzenesulfonylamino, or sulfo; Z in formula VI is fluorine, chlorine or bromine; m in formula IV is 1 through 5; m in formula VI is 0 through 3; n is 0 through 2; p in formula IV is 0 through 3; and p in formula VI is 1 through 3. The compounds of formula IV are particularly useful as insecticides and acaricides. The compounds of formula VI are particularly useful as insecticides, acaricides, bacteriostats and fungistats.

9 Claims, No Drawings

BIOCIDALLY ACTIVE BENZIMIDAZOLE COMPOUNDS

CROSS REFERENCE TO RELATED APPLICATION

This application is a division of application Ser. No. 570,159, filed Aug. 4, 1966, now U.S. Pat. No. 3,506,767.

The present invention relates to a new process for the production of 1,2-nitranilines, 1,2-phenylene diamines, benzimidazoles, particularly 2-halogeno or 2-halogeno alkyl-substituted benzimidazoles; to compounds obtained by this process, compositions containing benzimidazoles, and to processes for the protection of organic material, particularly keratin-containing material, by treatment with such active substances.

For the production of aryloxy-1,2-phenylenediamines, up to the present only the synthesis of 3-phenoxy-1,2-phenylene diamine described by M. Oesterlin [Monatshefte 57, 31–44 (1953)] has been known. This process progresses by more than 5 steps to the difficultly identifiable end product. The second amino group is obtained by reduction of a subsequently introduced nitro group into the aminodiphenyl ether. H.A. Scarborough [Soc. 132, 2361–2367 (1929)] describes the care necessary and difficulties encountered in the nitration. Halogenations of nitro-, amino- and acetamido-diphenyl ethers are also known from this publication; these however, only lead in each case to the monohalogen compound or to tar products. Phenoxy-1,2-nitranilines or 1,2-phenylenediamines which are mono- or poly- halogenated have not been described up to the present.

It is also known that aromatic nitro compounds react on heating with aromatic primary amines in an alkaline medium to form azoxy and azo compounds.

Surprisingly, it has now been found that good yields of aryloxy and arylthio 1,2-nitranilines and, from these, the corresponding 1,2-phenylenediamines are obtained in a very pure state when a metal salt of an optionally non-ionogenically further substituted mono- or poly- nuclear phenol or thiophenol is reacted with a 3- or 5- halogen-2-nitroaniline which can contain other non-ionogenic, inert substituents and, if desired, the nitro group in the aryloxy- or arylthio-2-nitroaniline is reduced to the amino group.

A particular embodiment of the present invention concerns the production of 1,2-nitranilines and of 1,2-phenylenediamines of the general formula I

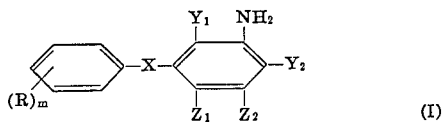

(I)

In this formula:
one of the symbols $Y_1$ and $Y_2$ represents the nitro group or the primary amino group, the other represents hydrogen or halogen.

$Z_1$ and $Z_2$ each represent hydrogen or halogen,

R represents lower alkyl, halogeno-lower alkyl, lower alkoxy or lower alkylthio, halogen, particularly chlorine or bromine, X represents oxygen or sulfur, m represents an integer of from 0 to 5.

These compounds are obtained by reacting a compound of the general formula II

(II)

wherein R, X, and m have the meanings given in formula I, in the presence of a strong inorganic base, with a halogen-2-nitroaniline of the general formula III

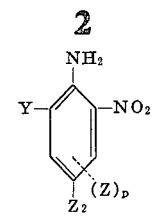

(III)

wherein one of the two Z's represents halogen, the other Z and $Z_2$ and Y represent hydrogen or halogen and p is 1 or 2 and if desired, reducing the nitro group in the condensation product to the amino group.

The preferred temperatures for the condensation lie within the range of 100° to 200° C. It is of advantage to the progress of the reaction if the inorganic base is added as concentrated aqueous solution. The principal bases are the hydroxides of alkali and alkaline earth metals. The condensation can be accelerated by the addition of catalysts such as copper.

The reduction of the nitro group to the amino can be performed by the usual methods, e.g. with catalytically activated hydrogen in the presence of metal catalysts such as Raney nickel palladium etc, with nascent hydrogen by means of base metals and acids, with stannous salts in acid solution etc. Preferably the reduction is performed by Bechamp's a method, i.e. with pulverized iron in weakly acid aqueous solution.

By the new process, the compounds of general formula I are obtained in yields of 70 – 95 percent and in a state almost pure enough for analysis. Thus, laborious purification operations are not necessary. It is particularly surprising that, for the reaction with the phenolates or marcaptides, the amino group of the halogen-2-nitraniline has not to be protected by acylation. On the contrary, tests have shown that on using corresponding halogen-nitro-N-acetyl anilines, the yield on saponification of the acetylamino group, drops to about 30 percent.

The compounds according to the invention are valuable intermediate products for the production of pharmaceuticals, pest control agents, optical brighteners and dyestuffs. For example, 1,2-phenylenediamines are used for the production of blue fluorescent bis-benzimidazol-2-yl-ethylenes which, as valuable optical white shades, have become of industrial importance. On condensing 1,2-phenylenediamines with 1,4,5,8-naphthalene tetracarboxylic acid, valuable vat dyestuffs are obtained. 1,2-nitranilines are valuable diazo components for the production of ice dispersion and pigment dyestuffs.

According to a second aspect of the invention, the above-mentioned 1,2-nitranilines and 1,2-phenylene diamines are preferably used as intermediates for the production of 2-halogeno benzimidazoles of the formula IV

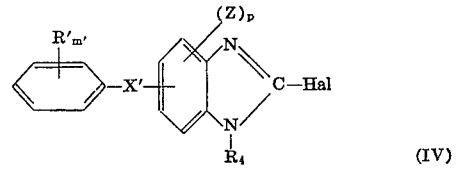

(IV)

wherein
R' is hydrogen, halogen, or trifluoromethyl;
Hal is halogen, preferably chlorine or bromine,
$R_4$ is hydrogen or a metal cation,
X' is oxygen, sulfur, sulfinyl, or sulfonyl,
Z is halogen, nitro, hydroxy, mercapto, alkyl of up to six carbon atoms, alkoxy of up to six carbon atoms, alkylthio of up to six carbon atoms, trifluoromethyl, lower alkyl-substituted amino, benzoylamino, halogeno benzoylamino, trifluoromethyl benzoylamino, benzene sulfonylamino, halogenosulfonyl-amino, alkylsulfonylamino, alkylsulfinyl, alkylsulfonyl, trifluoromethyl benzenesulfonylamino, trifluoromethyl halogeno benzenesulfonylamino or the radical of sulfonic acid and its salts, ester and amide forms,
m' is an integer of from 1 to 5, and
p is an integer of from 0 to 3.

These 2-halogeno benzimidazoles have excellent insecticidal and acaricidal activity, particularly however, marked activity against insects and their stages of development, such as moth larvae and also fur and carpet beetle larvae, which injure keratin material. Due to their affinity to keratin fibers, the 2-halogen-benzimidazole derivatives of general formula I draw onto these fibers from aqueous dispersions and, if $R_4$ is hydrogen, also from aqueous solutions of their salts, and, in this way, the keratin material treated therewith is protected from injury caused by the larvae of clothes moths and other moths as well as that caused by larvae of fur and carpet beetles (Anthronus and Attagenus).

These compounds are also active, however, against other insects, including termites, as well as mites and are thus used for general pest control, particularly for industrial application in the protection of plants and, in particular, material, e.g. for the protection of organic materials such as paper, wood, textiles, synthetic materials etc. against attack by insects and mites.

The compounds with a halogenated phenoxy group, are of particular interest.

The new 2-halogeno benzimidazoles are prepared according to the invention, by reacting a 2-hydroxy-benzimidazole of the formula V

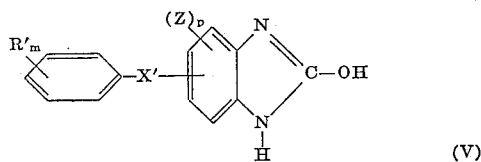

wherein R', X', m, Z and p have the same meaning as defined above, for instance, with phosphorus oxychloride (POCl$_3$) or phosphorus oxybromide (POBr$_3$), optionally, in the presence of hydrochloric acid or hydrobromic acid and, if desired, transforming the 2-halogeno benzimidazoles so obtained into their salts. [Helv. chim. acta 44, 1278 (1961); J. Chem. Soc. 1963, 2934; Gazz. ital. 88, 13 (1958)]. The production of 2-hydroxy benzimidazoles serving as starting material by various usual processes is also described in these citations.

Alternatively, 2-mercapto-benzimidazoles may be used as starting material for the production of 2-halogeno benzimidazoles. The new 2-halogeno benzimidazoles are then obtained by:

a. oxidizing such starting materials with a suitable oxydizing agent such as potassium permanganate to form the corresponding 2-sulfonic acid derivative and reacting this with phosphorus pentachloride or phosphorus oxychloride to form the instable sulfonic acid chloride which decomposes into the corresponding 2-chlorobenzimidazole [Annalen der Chemie 647, 5–7, (1961) describe similar reactions], or b. treating such starting materials with chlorine in the presence of water and, if desired another solvent, and, if desired, transforming the 2-halogen-benzimidazoles obtained according to (a) or (b) into their salts. [Similar reactions are described in J. Am. Chem. Soc. 72 4890 (1950)]. Carbon tetrachloride and, particularly, glacial acetic acid, are used, e.g. as solvents for this reaction.

When the oxidative chlorination of nuclear unsubstituted 2-mercapto-benzimidazole is performed in acetic acid at room temperature for a longer time (5 hours) then, with simultaneous chlorination of the nucleus, a mixture of 2,5,6-trichloro-benzimidazole and 2,5,6,7-tetrachlor-benzimidazole is formed [Knobloch and Rintelen, Archiv. der Pharmazie 291 (63. Vol.) pages 180–184 (1958)].

The 2-mercapto-benzimidazoles which can be used as starting materials in the modified process according to the invention, can be obtained by known processes, e.g. by reacting correspondingly substituted o-phenylenediamines with carbon disulfide, thiophosgene or thiourea. The o-phenylenediamines necessary for these reactions can be produced in their turn by the process of the present invention as described above.

If desired, phenylthio-1,2-phenylenediamines can be oxidized by known methods to obtain phenylsulfinyl-or phenylsulfonyl-1,2-phenylene diamines.

According to a third aspect, the present invention relates to new 2-trifluoromethyl benzimidazoles processes for their production and compositions containing such 2-trifluoromethyl benzimidazoles.

2-Trifluoromethyl-benzimidazoles which contain at least one phenyl radical bound to the benzo ring by way of an oxygen or sulfur atom, the sulfinyl or sulfonyl group, have not been known up to the present. It has now been found that such compounds containing the substituent mentioned in the 4(7)- and/or 5(6)- position, in which the phenyl radical itself is unsubstituted or can be substituted by ionogenic or non-ionogenic groups, have excellent pesticidal properties and are thus valuable for the control of pests of all types.

The 2-trifluoromethyl benzimidazoles of formula VI

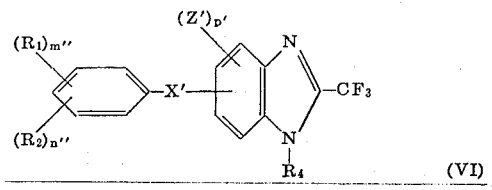

wherein $R_1$ represents a halogen atom having an atomic weight below 100, or a halogenoalkyl radical, $R_2$ represents a halogen atom having an atomic weight below 100 or a lower aliphatic hydrocarbon radical optionally bound by way of an oxygen or sulfur atom, the sulfinyl or sulfonyl group, Z' represents a halogen atom having an atomic weight below 100, hydrogen, lower alkyl, lower alkoxy, lower alkylmercapto;

$R_4$ represents hydrogen, or a metal cation;

X' represents an oxygen or sulfur atom, the sulfinyl or sulfonyl group, and m'' represents an integer of 0 to 3, n'' represents an integer of 0 to 2, p' represents an integer from 1 to 3 and, if $R_4$ = H, also their salts, are of particular importance for the combatting of pests because of their excellent insecticidal, acaricidal and microbicidal (bateriostatic and fungistatic) properties. These compounds have an excellent action on insects particularly on the larvae of insects which eat keratin fibers, e.g. Tineidae and Dermestidae, so that they are particularly suitable for the protection of keratin material.

In general formula VI of halogen atoms having an atomic weight below 100, chlorine and bromine atoms are preferred. The trifluoromethyl radical is the preferred halogenoalkyl radical $R_1$. By lower aliphatic hydrocarbon radicals, alkyl or alkenyl radicals having straight or branched chains are meant those, such as the methyl, ethyl, allyl or methallyl radical, the propyl, butyl or amyl radicals. In the case of $R_2$, these radicals can also be bound, by way of an oxygen or sulfur atom, the sulfonyl or sulfonyl group, to the phenyl radical.

The new 2-trifluoromethyl-benzimidazoles are produced according to the invention by reacting a 1,2-phenylenediamine having at least one phenyl radical bound by way of an oxygen or sulfur atom, the sulfinyl or sulfonyl group as substituent, with trifluoroacetic acid and/or with one of its reactive functional derivatives.

The following compounds are meant by functional derivatives of trifluoroacetic acid in the process according to the invention: trifluoroacetic acid anhydride, trifluoroacetic acid bromide and chloride, the esters, e.g. methyl, ethyl esters, as well as the corresponding or the esters and metal salts of trifluoroacetic acid, also trifluoroacetic acid amidine. The reaction can be performed simply with trifluoroacetic acid alone or with one of the derivatives given above. It is preferred, however, that trifluoroacetic acid be used in the reaction together with one of these derivatives, e.g. with trifluoroacetic acid anhydride.

New benzimidazoles from the group embraced by general formula VI are preferably produced by reacting a 1,2-phenylenediamine of the general formula

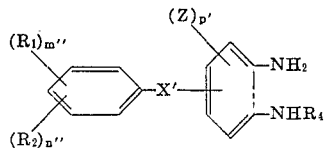

wherein $R_1$, $R_2$, $Z'$, $R_4$, $X'$, $m''$, $n''$ and $p'$ have the meanings given in formula VI, with trifluoroacetic acid and trifluoroacetic acid anhydride and, optionally, in reaction products so obtained wherein $R_4$ is hydrogen, converting them into the corresponding salts with an inorganic or organic base.

To produce such salts of the new benzimidazoles, inorganic bases, particularly the hydroxides of alkali metals, or organic bases, particularly tertiary amines, are used. The water soluble salts are of particular importance as the application of the new active ingredients is preferably made from aqueous media.

Benzimidazoles of general formula VI wherein $R_4$ is a lower aliphatic hydrocarbon radical or a benzyl or phenethyl radical optionally substituted in the nucleus by halogen, can be obtained also from benzimidazoles wherein $R_4$ is hydrogen or from salts of such benzimidazoles by reaction with an alkylating or aralkylating agent, optionally in the presence of an acid binding agent. Alkylating or aralkylating agents are esters of lower aliphatic or araliphatic alcohols with strong acids such as halogen hydracids, sulfuric acid or aryl sulfonic acids. Inorganic bases, e.g. the hydroxides and carbonates of alkali and alkaline earth metals or organic bases, particularly tertiary amines such as trialkylamines or pyridine are used as acid binding agents.

The 1,2-phenylenediamines used as starting materials for the process according to the invention can be produced from corresponding nitranilines by reduction according to Bóchamps. These nitranilines can be produced by condensation of metal salts of phenols and thiophenols with halogennitranilines.

The condensation product with thiophenol, after acylation of the amino group, can then be oxidized to form the corresponding phenylsulfinyl or phenylsulfonyl acyl-nitranilines. Hydrogen peroxide, potassium permanganate or organic per acids such as peracetic acid are examples of oxidizing agents.

The term "lower alkyl" as used, per se or in combination with other groups, in the specification and appended claims means hydrocarbons with up to six C-atoms like, for instance, methyl, ethyl, propyl, isopropyl, butyl etc.

The term "lower alkoxy" is used for an alkoxy group with up to six C-atoms like, methoxy, ethoxy, propoxy etc.

The following examples serve to illustrate the present invention without limiting the same thereto. Where not otherwise stated, parts are given as parts by weight. The temperatures are given in degrees Centigrade.

EXAMPLE 1 a. 48.2 Parts of 3,4,6-trichloro-2-nitraniline are added to 18.82 parts of molted pHenol at 90° and the whole is heated to 130°. At this temperature, 11.2 parts of aqueous 50 percent potassium hydroxide solutionare added dropwise within 1 hour. The water is continuously distilled from the mixture. The reaction mixture is then heated for 6 hours at 140°–150° while stirring whereupon it is cooled to 100° and 300 parts by volume of boiling water are added. The solution is then stirred for 3 hours and afterwards left to stand for 12 hours. 1,500 parts by volume of water are then added to the reaction mixture, then 50 parts by volume of 30 percent aqueous sodium hydroxide solution are added and finally it is stirred for 2 hours. The precipitate formed is filtered off under suction, washed several times with water and dried in vacuo over NaOH. (Yield of crude product 65 parts = 93.2 percent of the theoretical. M.P. 113°–115°). After recrystallization from ethanol, 4,6-dichloro-3-phenoxy-2-nitraniline melts at 133°–135°. The yield of pure product is 41.5 parts (69.4 percent of the theoretical).

b. 14 Parts by volume of 80 percent acetic acid are added to 66 parts of iron powder in 350 parts by volume of water at 80° and the mixture is heated for 15 minutes at 90°–100°. At the same temperature, 59.8 parts of 4,6-dichloro-3-phenoxy-2-nitraniline are added in portions within 1 hour and the mixture is refluxed for 16 hours. After cooling to about 80°, the reaction is made weakly phenolphthalein alkaline with 20 parts of sodium carbonate and 400 parts by volume of chlorobenzene are added. After bringing quickly to the boil it is filtered hot and the residue is washed with hot chlorobenzene. The chlorobenzene phase is separated in a separating funnel, washed with water, dried over sodium sulphate and evaporated to dryness in vacuo. The 4,6-dichloro-3-phenoxy-1,2-phenylenediamine is obtained as an oil in the crude state and is obtained in crystalline form from hot benzene/petroleum ether. The yield of pure product is 39.4 parts. M.P. 85°–87°.

EXAMPLE 2 a. 48.2 Parts of 3,5,6-trichloro-2-nitraniline are added to 29.4 parts of melted 4-chlorothiophenol at 100° and the whole is heated to 130°. 11.2 Parts of aqueous 50 percent potassium hydroxide solution are then added dropwise to the melt within 1 hour. The amount of water added is distilled off within 5 hours at a temperature of 130°–145°. The melt is then stirred for another 4 hours at 145°, then cooled to 100° and 200 parts by volume of hot water are added. The mixture is then left to stand for 12 hours at room temperature. 1,000 parts by volume of water and 50 parts by volume of 30 percent aqueous sodium hydroxide solution are then added and the whole is stirred for 2 hours at room temperature. The crystalline precipitate is isolated, washed several times with water and dried in the air. Yield of crude product: 65 parts (93.2 percent of the theoretical), M.P. 113°–115°. Recrystallized from ethanol, 4,6-dichloro-3-(4'-chlorophenylthio)-2-nitraniline melts at 119°–120°. The yield of pure product is 49.5 parts = 71 percent of the theoretical.

b. 14 Parts by volume of 80 percent acetic acid are added to 66 parts of iron powder in 350 parts by volume of water and the mixture is heated for 15 minutes at 90°–100°. 69.8 Parts of 4,6-dichloro-3(4'-chlorophenylthio)-2-nitraniline are then added in portions within 2 hours at the same temperature and the reaction mixture is refluxed for 18 hours. The reaction is carefully made phenolphthalein alkaline with 18 parts of sodium carbonate, the reaction mixture is cooled to 80° and, at this temperature, 400 parts by volume of chlorobenzene are added. After stirring for a short time, it is filtered hot. The residue is washed with a little hot chlorobenzene. The chlorobenzene phase is separated in a separating funnel, washed with water, dried over sodium sulphate and then evaporated to dryness under water jet vacuum. The yield of crude 4,6-dichloro-3-(4'-chlorophenylthio)-1,2-phenylenediamine is 62 parts; M.P. 116°–118° (sinters at 110°). Recrystallized from benzene, the product melts at 116°–117° (yield: 48.2 parts = 75.5 percent of the theoretical).

From equivalent amounts of correspondingly substituted nitranilines and phenols or thiophenols, the phenoxy or phenylthio 2-nitranilines given in the first column are obtained and reduced to the 2-phenylenediamines given in column 2 by the processes described in examples 1 and 2.

| 1 | 2 |
|---|---|
| 4,6-dichloro-3-(4'-chlorophenoxy)-2-nitraniline, M.P. 127°–129° | 4,6-dichloro-3-(4'-chloro phenoxy)-1,2-phenylene diamine, M.P. 97°–99° |
| 4,6-dichloro-3-(3', 4'-dichlorophenoxy)-2nitraniline, M.P. 92°–94° | 4,6-dichloro-3-(3', 4'-di chlorophenoxy)-1,2-phenylene-diamine, M.P. 105°–107° |
| 4,6-dichloro-3-(2',4'-dichlorophenoxy)-2-nitraniline, M.P. 134°–135° | 4,6-dichloro-3-(2',4'-di chlorophenoxy)-1,2-phenylene-diamine, M.P. 115°–117° |
| 4,6-dichloro-3-phenylthio-2-nitraniline, M.P. 157°–159° | 4,6-dichloro-3-phenylthio-1,2-phenylenediamine, oil |
| 4,6-dichloro-3-(2', 5'-dichlorophenylthio)-2-nitraniline, M.P. 165°–167° | 4,6-dichloro-3-(2', 5'-di chlorophenylthio)-1,2-phenylenediamine, M.P. 166°–168° |
| 3,4-dichloro-5-(4'-chloro- | 3,4-dichloro-5-(4'-chloro- | phenoxy)-2-nitraniline M.P. 190°–192° phenoxy)-1,2-phenylenediamine, M.P. 104°–106°

The following o-phenylene diamines are produced in the same way as described in the foregoing examples: Table I
1. 4-(4'-chlorophenoxy)-5-chloro-1,2-phenylenediamine M.P. 136°–137° C
2. 4-(4'-chlorophenylthio)-5-chloro-1,2-phenylene-diamine M.P. 121°–122° C
3. 4-(2',4'-dichlorophenoxy)-5-chloro-1,2-phenylene-diamine Oil
4. 4-(3', 4'-dichlorophenoxy)-5-chloro-1,2-phenylene-diamine M.P. 95°–97° C
5. 4-(2',5'-dichlorophenylthio)-5-chloro-1,2-phenylene-diamine M.P. 160°–162° C
6. 4-phenylthio-5-chloro-1,2-phenylene - diamine M.P. 77°–79 C
7. 4-(4'-bromophenoxy)-5-chloro-1,2-phenylenediamine M.P. 141°–143° C
8. 4-(4'-methoxyphenoxy)-5-chloro-1,2-phenylenediamine M.P. 79°–80° C
9. 4-(3'-trifluoromethyl-4'-chloro-phenoxy)-5-chloro-1,2-phenylenediamine M.P. 99°–101° C
10. 4-(2',4',5'-trichlorophenoxy)-5-chloro-1,2-phenylenediamine
11. 3,5-dichloro-6-(4'-chlorophenoxy)-1,2-phenylenediamine M.P. 97°–99° C
12. 3,5-dichloro-6-phenoxy-1,2-phenylenediamine M.P. 85°–87° C
13. 3,5-dichloro-6-phenylthio-1,2-phenylendiamine Oil
14. 3,5-dichloro-6-(4'-chlorophenoxy)-1,2-phenylenediamine M.P. 116°–117° C
15. 3,5-dichloro-6-(2',4'-dichlorophenoxy)-1,2-phenylenediamine M.P. 115°–117° C
16. 3,5-dichloro-6-(3',4'-dichlorophenoxy)-1,2-phenylenediamine M.P. 105°–107° C
17. 3,5-dichloro-6-(2',3'-dichlorophenylthio)-1,2-phenylene-diamine M.P. 166°–168° C
18. 3,5-dichloro-6-(4'-bromophenoxy)-1,2-phenylenediamine M.P. 82°–84° C
19. 3,5-dichloro-6-(4'-methoxyphenoxy )-1,2-phenylenediamine Oil
20. 3,5-dichloro-6-(2',4',5'-trichlorophenoxy)-1,2-phenylene-diamine M.P. 143°–145° C
21. 3,5-dichloro-6-(3'-trifluoromethyl-4'-chlorophenoxy)-1,2-phenylenediamine M.P. 117°–120° C
22. dichloro-5-(4'-chlorophenoxy)-1,2-phenylene-diamine M.P. 188°–190° C
23. dichloro-5-(2',4'-dichlorophenoxy)-1,2-phenylene-diamine crude oil
24. -dichloro-5-phenylthio-1,2-phenylenediamine Oil
25. -dichloro-5-(3',4'-dichlorophenoxy)-1,2-phenylenediamine Oil
26. dichloro-5-(2',5'-dichlorophenylthio)-1,2-phenylene-diamine M.P. 184°–186° C
27. 3,5-dichloro-4-(4'-chlorophenoxy)-1,2-phenylenediamine M.P. 143°–144° C
28. 3,5-dichloro-4-(2',4'-dichlorophenoxy)-1,2-phenylenediamine oil
29. 3-bromo-4-(4'-chlorophenoxy)-5-chloro-1,2-phenylenediamine M.P. 156°–157.5° C
30. 4-chloro-5-(4'-chlorophenylsulfinyl)-1,2-phenylenediamine
31. 4-chloro-5-(4'-chlorophenylsulfonyl)-1,2-phenylenediamine M.P. 169°–172° C
32. 3,5-dichloro-6-(4'-chlorophenylsulfinyl)-1,2-phenylene-diamine M.P. 190°–192° C
33. 3,5-dichloro-6-(4'-chlorophenylsulfonyl)-1,2-phenylene-diamine M.P. 140°–142° C.

EXAMPLE 3

15.2 parts of 2-mercapto-4,6-dichloro-7-(3',4'-dichlorophenoxy)-benzimidazole [produced by condensation of 3,5-dichloro-6-(3',4'-dichlorophenoxy)-1,2-phenylenediamine with $CS_2$, $CSCl_2$ or thiourea] are dissolved in 400 parts by volume of glacial acetic acid to which 35 parts by volume of concentrated hydrochloric acid and 2 drops of concentrated $HNO_3$ are added. At 20°–25°, a solution of 11.2 parts of chlorine in 200 parts by volume of carbon tetrachloride are added dropwise within 1 hour and the whole is stirred for 14 hours at 20°. The reaction mixture is then evaporated to dryness and made strongly alkaline with concentrated NaOH (pH 11–12) whereupon the product almost completely dissolves. Undissolved particles are filtered off and the pH of the filtrate is adjusted to pH 4 with concentrated hydrochloric acid whereupon the product precipitates. The precipitate is filtered off under suction washed and dried at 60°. The pure 2,4,6-trichloro-7-(3',4'-dichlorophenoxy)-benzimidazole melts at 116°–122°.

EXAMPLE 4

12 parts of 4,6-dichloro-7-(3'-trifluoromethyl-4'-chlorophenoxy)-2-hydroxy-benzimidazole [produced by a condensation of 3,5-dichloro-6-(3'-trifluoromethyl-4'-chlorophenoxy)-1,2-phenylenediamine with phosgene, urea or chlorocarbonic acid ester] in 120 parts by volume of phosphorus oxychloride are boiled until a clear solution is formed. A weak stream of hydrogen chloride is then introduced for 3 hours. After this time, the reaction mixture is cooled and the excess phosphorus oxychloride is distilled off in vacuo. The oily residue is poured into 1,000 parts of 20° cold water, and, after stirring for 1 hour, is extracted with ether. The ether phase is washed until it is neutral, dried with sodium sulphate and evaporated. Recrystallized from toluene, the pure 2,4,6-trichloro-7-(3'-trifluoromethyl-4'-chlorophenoxy)-benzimidazole obtained melts at 234°–235°.

EXAMPLE 5

7.7 parts if 2,4,6-trichloro-7-(3',4'-dichlorophenoxy)-benzimidazole are idssolved in 80 parts by volume of dimethyl formamide and, after the addition of some parts per thousand of $SeCl_3$, chlorine gas is added. The temperature is kept at 25°–30°. After introducing chlorine gas for 2 hours, the reaction mixture is poured into 500 parts of ice water and the precipitated resinous product is isolated an d dissolved in 15 parts by volume of 30% NaOH with the addition of 1,000 parts of water. The somewhat opaque solution is filtered and precipitated with concentrated hydrochloric acid. Recrystallization from ethanol/water yields pure 2,4,5,6-tetrachloro-7-(3',4'-dichlorophenoxy)-benzimidazole which melts at 245°–247°.

EXAMPLE 6

7.7 parts of 2-mercapto-4,6-dichloro-7-phenoxybenzimidazole are suspended in 150 parts by volume of concentrated hydrobromic acid (4°percent) and then, at room temperature, a solution of 16 parts of bromine in 50 parts by volume of hydrobromic acid is added dropwise. The whole is then stirred for 24 hours at 35°–40°. The reaction mixture is then poured into 1,000 parts by volume of ice water, the product which precipitates is filtered off and washed with water. The residue is dissolved in 1N sodium hydroxide solution, active charcoal is added, the solution is filtered and the residue is precipitated by acidifying with concentrated hydrobromic acid to pH 2–3. The resulting 2,5-dibromo-4,6-dichloro-7-phenoxy-benzimidazole is filtered off, washed until it is neutral and dried.

EXAMPLE 7

1. 2-Nitro-3-amino-4',6-trichloro diphenylether 56.7 g of 2-nitro-3,4,6-trichloroacetanilide (German Patent 178,299) are heated together with 25.7 g of p-chlorophenol and 44.8 g of caustic potash solution (50 percent) in an oil bath at 150°–160°C for 16 hours while stirring. Volatile portions are distilled off thereby. After cooling to 100°, the obtained melt is poured into a mixture of 2 l. water and 200 ml. 1 N NaOH. The mixture is stirred at 25° for 30 minutes and the product filtered off by suction. The crude material is re-crystallized from alcohol. The yield is 20.7 g (corresponding to 31.2 percent of the theoretical yield). The obtained 2-nitro-3-amino-4,4',6-trichloro diphenylether melts at 125°–127° C.

2. 2,3-Diamino-4,4',6-trichlorodiphenylether 120 ml of water are heated and 19.8 g of iron powder added. The mixture is heated to 90°C while stirring, 4.5 ml of glacial acetic acid are added and the mixture stirred for another 10 minutes at 90° to 95° C. During the next hour, 20 g of 2-nitro-3-amino-4,4',6-trichlorodiphenylether are added gradually and subsequently 25 ml of alcohol. Stirring is continued throughout the night while boiling under reflux. After cooling down the mixture, solid sodium carbonate is added until the mixture is alkaline to phenolphthalein. After the addition of 180 ml of chloro benzene, the mixture is heated to boiling and the insoluble parts are filtered off through a china clax filter while still hot. The organic phase is separated from the aqueous phase by means of a separating funnel. The organic phase is then washed with water and dried over sodium sulfate. The obtained chloro benzene solution is evaporated to dryness and the obtained product recrystallized from alcohol. 15.6 g of 2,3-diamino-4,4',6-trichlorodiphenylether are obtained having a melting point of 97° to 99° C.

3. 2-Mercapto-4,6-dichloro-7-[4'-chlorophenoxy]benzimidazole 15.2 g of 2,3-diamino-4,4',6-trichloro diphenylether and 70 ml of alcohol are placed in a flask and a solution of 10 g of potassium ethyl xanthogenate in 15 ml of water is added. The mixture is heated to boiling under reflux for 40 hours while stirring. While still hot, 150 ml of water are added and the mixture adjusted to a pH of 6 by the addition of glacial acetic acid. After cooling, the precipitate is filtered off by suction and washed with water. The crude product is dissolved in a mixture of 30 ml concentrated NaOH, 30 ml alcohol, and 650 ml water. Insoluble material is removed by filtration, and the filtrate acidified by the addition of hydrochloric acid. The obtained precipitate is filtered off by suction, washed thoroughly with water and dried. 9.2 g of 2-mercapto-4,6-dichloro-7-[4'-chlorophenoxy]benzimidazole are obtained having a melting point of 245° to 247° C.

4. 2,4,6-Trichloro-7-[4'-chlorophenoxy]benzimidazole 9.2 g of 2-mercapto-4,6-dichloro-7-[4'-chlorophenoxy]benzimidazole are dissolved in 250 ml of glacial acetic acid with warming and 25 ml of concentrated hydrochloric acid as well as 2 drops of concentrated nitric acid are added. The mixture is cooled to 17° C and chlorine passed in (up to a total of 6 g) during one hour while stirring. Stirring is continued for another 15 minutes. The reaction mixture is poured into 1 l of ice water, the precipitate is filtered off by suction and washed with water. The product is recrystallized from alcohol, then from benzene. 2.5 g of 2,4,6-trichloro-7-[4'-chlorophenoxy]benzimidazole are obtained having a melting point of 112°–120° C.

The following compounds according to the invention may be produced in the manners described in Examples 3 to 7.

TABLE II

| | M.P. °C. |
|---|---|
| 1) 2,6-dichloro-5-phenoxy-benzimidazole | 240°–242° |
| 2) 2,6-dichloro-5phenylmercapto-benzimidazole | 243°–244° |
| 3) 2,6-dichloro-5-(4'-chlorophenoxy)-benzimidazole | 199°–201° |
| 4) 2,6-dichloro-5-(4'-chlorophenylmercapto)-benzimidazole | 207°–208° |
| 5) 2,6-dichloro-5-(4'-bromophenoxy)-benzimidazole | 193°–195° |
| 6) 2,6-dichloro-5-(2',4'-dichlorophenoxy)-benzimidazole | 216°–218° |
| 7) 2,6-dichloro-5-(3',4'-dichloro-phenoxy)-benzimidazole | 220°–227° |
| 8) 2,6,7-trichloro-5-(4'-chlorophenoxy)-benzimidazole | >245°(decomposition) |
| 9) 2,6,7-trichloro-5-(4'-chlorophenylmercapto)-benzimidazole | 273°–275° |
| 10) 2,6,7-trichloro-5-(2',5'-dichlorophenylmercapto-benzimidazole | 237°–239° |
| 11) 2,6-dichloro-5-(4'-methoxyphenoxy)-benzimidazole | 201°–203° |
| 12) 2,4,6-trichloro-7-phenoxy-benzimidazole | 173°–179° |
| 13) 2,4,6-trichloro-7-phenylmercapto-benzimidazole | 197°–205° |
| 14) 2,4,6-trichloro-7-(4'-chlorophenoxy)-benzimidazole | 112°–120° |
| 15) 2,4,6-trichloro-7-(4'-chlorophenylmercapto)-benzimidazole | 213°–216° |
| 16) 2,4,6-trichloro-7-(4'-bromophenoxy)-benzimidazole | 127°–130° |
| 17) 2,4,6-trichloro-7-(2',4'-dichloro-phenoxy)-benzimidazole | >117° (decomposition) |
| 18) 2,4,6-trichloro-7-(2',5'-dichlorophenylmercapto)-benzimidazole | 197°–200° |
| 19) 2,4,6-trichloro-7-(2',4',5' phenoxy-benzimidazole | >145° (decomposition) |
| 20) 2,4,6-trichloro-7-(4'-methoxyphenoxy)-benzimidazole | 164°–166° |
| 21) 2,4,6-trichloro-7-(4'-chlorophenylsulfinyl)-benzimidazole | 292°–295° |
| 22) 2,4,6-trichloro-7-(4'-chlorophenylsulfonyl)-benzimidazole | 271°–273° |
| 23) 2,4,6,7-tetrachloro-5-(4'-chlorophenoxy)-benzimidazole | 285°–296° |
| 24) 2,4,5,6-tetrachloro-7-(4'-chlorophenylsulfinyl)-benzimidazole | 310°–312° |
| 25) 2,4,6-trichloro-5-bromo-7-(3',4'-dichlorophenoxy)-benzimidazole | 263°–264° |
| 26) 2,6-dichloro-4,7-dibromo-5-(4'-chlorophenoxy)-benzimidazole | 285°–287° |
| 27) 2,4,6,7-tetrachloro-5-(2',4'-dichlorophenoxy)-benzimidazole | |
| 28) 2,6-dichloro-4,7-dibromo-5-(2',4'-dichlorophenoxy)-benzimidazole | |
| 29) 2,4,6-trichloro-5-(4'-chlorophenoxy)-benzimidazole | |
| 30) 2,4,6-trichloro-5-(4'-chlorophenylmercapto)-benzimidazole | |
| 31) 2,4,6-trichloro-5-(2',4'-dichlorophenoxy)-benzimidazole | |
| 32) 2,4,6-trichloro-5-(2',5'-dichlorophenylmercapto)-benzimidazole | |
| 33) 2,4,6-trichloro-5-(4'-chloro-5'-trifluoromethylphenoxy)-benzimidazole | |
| 34) 2,4,6-trichloro-5-(2',4',5'trichlorophenoxy)-benzimidazole | |
| 35) 2,6-dichloro-4-bromo-5-(4'-chlorophenoxy)-benzimidazole | |
| 36) 2,6-dichloro-4-bromo-5-(4'-chlorophenylmercapto)-benzimidazole | |
| 37) 2-chloro-5-phenylsulfamoyl-benzimidazole | 211°–213° |
| 38) 2,4,6-trichloro-5-(4'-chlorophenylsulfamoyl)-benzimidazole | 223°–225° |
| 39) 2,4,6-trichloro-5-(3'-trifluoromethyl-4'-chlorophenylsulfamoyl)-benzimidazole | |
| 40) 2,4,6-trichloro-5-(N-methyl-N-3',4'-dichlorophenylsulfamoyl)-benzimidazole | >210°(decomposition) |
| 41) 2-chloro-5-(tetrachloro-phenylsulfamoyl)-benzimidazole | 228°–229° |
| 42) 2-chloro-5-(4'-chlorophenylsulfonylamino)-benzimidazole | 226°–227° |
| 43) 2-chloro-5-(2'-methyl-4',5'-dichlorophenylsulfonylamino)-benzimidazole | 236°–237° |
| 44) 2,6-dichloro-5-methylsulfonylamino-benzimidazole | |
| 45) 2,6-dichloro-5-(4'-chlorophenylsulfonyl)-benzimidazole | |
| 46) 2,4,6-trichloro-5-methylsulfonylamino-benzimidazole | |
| 47) 2,4,6-trichloro-5-(4'-chloro-phenyl sulfonylamino)-benzimidazole | >190°(decomposition) |
| 48) 2-chloro-4,6,7-tetrabromo-5-methylsulfonylamino-benzimidazole | |
| 49) 2-chloro-5-(3'-trifluoromethyl-4'-chloro-phenylsulfonylamino)-benzimidazole | 188°–191° |
| 50) 2,4,6,7-tetrachloro-5-(4'-chlorophenyl-sulfonylamino)-benzimidazole | >135 (decomposition) |
| 51) 2-chloro-5-(3',4'-dichlorobenzoylamino)-benzimidazole | 214°–215° |
| 52) 2-chloro-5-(2',4',5' amino)-benzimidazole | 283°(decomposition) |
| 53) 2,4-dichloro-5-(3',4'-dichlorobenzoylamino)-benzimidazole | |
| 54) 2,6-dichloro-5-(2',4',5'trichlorobenzoylamino)-benzimidazole | |
| 55) mixture of 70% 2,4,6,7-tetrachloro and 30% 2,4,6-trichloro-5-(3',4'-dichloro-benzoylamino)-benzimidazole | >170°(decomposition) |
| 56) 2-chloro-5-(3'-trifluoromethyl-4'-chlorophenylcarbamoyl)-benzimidazole | 140° |

The compounds of formula IV which are illustrated by examples 3 to 6 can be used according to the usual methods for textile finishing. They have affinity to keratin material and are excellently suitable, therefore, for the protection of such materials from injury by insects, in particular they are suitable for the wash and light fast moth-proofing of such materials both in the crude as well as in the processed state, for example of raw or processed sheep's wool as well as other animal hairs, fells and furs. In addition to the wash and light fast moth-proofing in the dyebath, the compounds can also be used for the impregnation of wool and woollen articles in dry cleaning processes, the materials then becoming equally excellently moth proofed.

In addition to their insecticidal action on the larvae of the clothes moth, the compounds of formula IV are also active against the larvae of the fur and carpet beetles. The textiles treated in any way desired with the compounds according to the invention such as woollen blankets, woollen carpets, woollen underwear, woollen clothes and knitted goods, are given protracted protection from the usual types of insects which are injurious to keratin material.

The agents used for the protection of keratin materials against injury by insects should contain the active substances of formula IV in a finely distributed form. Thus, solutions, suspensions and emulsions of the active substances in particular are used.

The compounds containing a hydrogen atom in the heterocyclic ring ($R_4$ = H), in the form of their alkali metal salts generally have good water solubility. They can be applied to the keratin material direct from these aqueous solutions, either by dipping the material for a shorter or longer time in the alkali metal salt solution, or spraying them with the solutions, or by treating them in the solutions at a raised temperature as in dyeing processes.

Because of their solubility in organic solvents, these compounds are also particularly well suited for application from non-aqueous media. Thus, the materials to be protected can simply be impregnated with these solutions or, if a suitable solvent is chosen, the moth proof finishing can be combined with a dry cleaning process.

Propylene glycol, methoxyethanol, ethoxyethanol and dimethyl formamide have provided to be particularly suitable organic solvents, to which can be added distributing agents and/or other auxiliaries such as soaps and aqueous sodium hydroxyde solutions. Emulsifying agents such as sulfated ricinus oil, sulfite waste liquor and fatty alcohol sulfates are particularly mentioned as distributing agents.

EXAMPLE 8

First, a 20 percent solution of 2,4,6-trichloro-7-(3',4'-dichlorophenoxy)-benzimidazole in glycol monomethyl ether is produced. 10 Parts by volume of this solution are diluted with 200 parts by volume of a solvent suitable for dry cleaning, e.g. a suitable benzine fraction ("Diluan S"). If desired, other cleansing additives can be added. The woollen articles are then treated in this cleansing liquor in the usual way and subsequently centrifuged to a content of solvent of about 100 percent of the weight of the wool. After drying, they prove to be mothproofed.

Baths of the same or analogous composition can also be used in an analogous way for the moth proofing of untreated or already otherwise treated or cleaned articles.

Similar mixtures can also be used for the spraying of wool in every stage of processing.

The insecticidal action of 2-halogen-benzimidazole derivatives according to the invention of general formula IV against insects which injure keratin material was tested as given below, and the textile materials containing keratin which had been treated with these active substances were tested as to resistance to attack by insects which injure keratin material in the following way:

Test Methods and Results:

A 0.5 percent stock solution of each active substance to be tested in ethylene glycol monomethyl ether (methyl collosolve) is prepared. Then an aqueous application liquor is prepared at room temperature which contains 20 ml of the stock solution mentioned (0.1 g of active substance) in 400 ml liquor. 10 g of wool flannel are then well wetted with hot water and introduced into the liquor at room temperature. While constantly circulating the woollen sample, the bath temperature is raised to 60° C within 15 minutes, then 2 of 80 percent formic acid (calculated on the weight of the wool) are added and the treatment in the liquor is continued for another 30 minutes at this temperature. It is then cooled, the woollen sample is rinsed in running tap water, centrifuged and, for the purpose of drying, is hung up. The concentration of active substance is 1 percent, calculated on the weight of the wool.

The sample so dried is then subjected to the moth proofing test (injury by clothes moth Tineola biselliella) according to the Swiss Association for Standardisation leaflet 95901 and also it is tested for fastness to the fur beetle larvae (Attagenus piceus) and carpet beetle larvae (Anthrenus vorax) according to Swiss Association for Standardisation leaflet 95902; the method for Anthrenus larvae was simply applied to Attagenus piceus larvae in that 6–7 week old larvae of the latter type were used for the test. Basically, the method consists in cutting four equal sized pieces from the treated wool flannel sample and exposing each of these pieces for 14 days at a constant temperature (28° C) and constant relative humidity (65 percent), to the attack (appetite) of 15 larvae of the relative pest (two pieces of material with the same pest).

The results are tabulated as follows:

| | | |
|---|---|---|
| xxxx | very good protection | < 5% devoured material |
| xxx | good protection | 5 to 15% devoured material |
| xx | moderate protection | 15 to 50% devoured material |
| x | insufficient protection | > 50% devoured material |

| Compounds used in the test | Moths | Atta-genus | Anth-renus |
|---|---|---|---|
| 2,6-dichloro-5-(4'-chlorophenylmercapto)-benzimidazole | xxxx | xx | xxx |
| 2,6-dichloro-5-(2',4'-dichlorophenoxy)-benzimidazole | xxxx | xx | xxx |
| 2,6-dichloro-5-(3',4'-dichlorophenoxy)-benzimidazole | xxxx | xx | xxx |
| 2,4,6-trichloro-5-(4'-chlorophenoxy)-benzimidazole | xxx | xxx | xxx |
| 2,4,6-trichloro-7-phenoxy-benzimidazole | xxxx | xxx | xxx |
| 2,4,6-trichloro-7-phenylmercaptobenzimidazole | xxxx | xxx | xxx |
| 2,5-dibromo-4,6-dichloro-7-phenoxy-benzimidazole | x | xxxx | xxx |
| 2,4,6-trichloro-7-(4'-chlorophenoxy)-benzimidazole | xxxx | xxxx | xxx |
| 2,4,6-trichloro-7-(4'-chlorophenylmercapto)-benzimidazole | xxxx | xxxx | xxx |
| 2,4,6-trichloro-7-(2',5'-dichlorophenylmercapto)-benzimidazole | xxxx | xxxx | xxx |
| 2,4,6-trichloro-7-(2',4'-dichlorophenoxy)-benzimidazole | xxxx | xxxx | xxx |
| 2,4,6-trichloro-7-(3',4'-dichlorophenoxy)-benzimidazole | xxxx | xxxx | xxx |
| 2,4,6-trichloro-5-bromo-7-(3',4'-dichlorophenoxy)-benzimidazole | xxxx | xxxx | xxx |
| 2,4,5,6-tetrachloro-7-(3',4'-dichlorophenoxy)-benzimidazole | xxxx | xxxx | xxx |
| 2,4,5,6-tetrachloro-7-(4'-chlorophenylsulfinyl)-benzimidazole | xxxx | xxxx | xxx |
| 2,6-dichloro-4,7-dibromo-5-(4'-chlorophenoxy)-benzimidazole | xxxx | xxxx | xxx |
| 2,4,6,7-tetrachloro-5-(4'-chlorophenoxy)-benzimidazole | xxxx | xxxx | xxxx |
| 2,4,6-trichloro-7-(2', 4', 5'-trichlorophenoxy)-benzimidazole | xxxx | xxxx | xxx |

| 2,4,6-trichloro-7-(4'-chloro-5'-trifluoromethyl-phenoxy)-benzimidazole | xxxx | xxxx | xxxx |

EXAMPLE 9

15 Parts of 3-(3',4'-dichlorophenoxy)-4,6-dichloro-1,2-phenylenediamine are mixed at room temperature with 15 parts of trifluoroacetic acid and 15 parts of trifluoroacetic acid anhydride and the whole is then refluxed for 2 hours. Excess trifluoroacetic acid and its anhydride are then distilled off in vacuo.

The residue is taken up in 4N hydrochloric acid. The crystalline precipitate obtained is filtered off and recrystallized from methanol. The 2-trifluoromethyl-4-(3',4'-dichlorophenoxy)-5,7-dichlorobenzimidazole obtained melts at 115°.

Because of their good insecticidal, acaricidal and microbiocidal properties, the following 2-trifluoromethyl benzimidazoles are particularly well suited for the combatting of insects, insect larvae, spiders and larval stages thereof, micro-organisms (bacteria and fungi) in plant protection, stored protection and, in particular, for the protection of material:

2-trifluoromethyl-4-(3',4'-dichlorophenoxy)-5,7-dichloro benzimidazole M.P. 116° – 118°

2-trifluoromethyl-4-(4'-chlorophenoxy)-5,7-dichloro-benzimidazole, M.P. 205° – 207°

2-trifluoromethyl-4-(2',4'-dichlorophenoxy)-5,7-dichlorobenzimidazole M.P. 194° – **°

2-trifluoromethyl-4-phenoxy-5,7-dichlorobenzimidazole M.P. 204° – 206°

2trifluoromethyl-4-(3'-trifluoromethyl-4'-chlorophenoxy)-5,7-dichloro-benzimidazole, M.P. 199° – 201°

2-trifluoromethyl-4-phenylthio-5,7-dichloro-benzimidazole, M.P. 177° – 179°

2-trifluoromethyl-4-(4'-chlorophenylthio)-5,7-dichlorobenzimidazole, M.P. 218° – 220°

2-trifluoromethyl-4-(4'-chlorophenylsulfinyl)-5,7-dichlorobenzimidazole, 2-trifluoromethyl-4-(4'-chlorophenylsulfonyl)-5,7-dichlorobenzimidazole, M.P. 238° – 240°

2-trifluoromethyl-4-(4'-chlorophenoxy)-5,7-dichloro-6-bromobenzimidazole, 2-trifluoromethyl-4-(3',4'-dichlorophenoxy)-5,6,7-trichlorobenzimidazole, 2-trifluoromethyl-4-(4'-bromophenoxy)-5,7-dichloro-benzimidazole, M.P. 201° – 203°

2-trifluoromethyl-4-(4'-bromophenoxy)-5,7-dichloro-6-bromobenzimidazole, 2-trifluoromethyl-6-(3',4'-dichlorophenoxy)-5-chloro-benzimidazole, 2-trifluoromethyl-6-(4'-chlorophenylthio)-5-chloro-benzimidazole, 2-trifluoromethyl-6-(4'-chlorophenylsulfinyl)-5-chlorobenzimidazole, 2-trifluoromethyl-6-(4'-chlorophenylsulfonyl)7-5-chlorobenzimidazole, 2-trifluoromethyl-6-(3',4'-dichlorophenoxy)-4,5,7-trichloro-benzimidazole, 2-trifluoromethyl-6-(4'-chlorophenylthio)-4,7-dibromobenzimidazole, 2-trifluoromethyl-6-(4'-chlorophenylsulfinyl)-4,7-dibromo-5-chloro-benzimidazole, 2-trifluoromethyl-6-(4'-chlorophenylsulfonyl)-4,7-dibromo- 5-chloro-benzimidazole, 2-trifluoromethyl-6-(4'-bromophenoxy)-5-chloro-benzimidazole, 2-trifluoromethyl-6-(4'-bromophenoxy)-5-chloro-benzimidazole, 2-trifluoromethyl-6-(3'-trifluoromethyl-4'-chlorophenoxy)-5-chlorobenzimidazole, 2-trifluoromethyl-4-(3',4'-dichlorophenoxy)-5,7-dichloro-6-methyl-benzimidazole, 2-trifluoromethyl-4-(4'-chlorophenoxy)-5-fluoro-benzimidazole, 2-trifluoromethyl-4-(3'-chlorophenoxy)-6,7-dichloro-benzimidazole, M.P. 190° – 192°

2-trifluoromethyl-4-(2',5'-dichlorophenylthio)-5,7-dichloro-benzimidazole M.P. 198° – 200°

2-trifluoromethyl-4-(3'-trifluoromethylphenoxy)-5,7-dichloro-benzimidazole M.P. 177° – 179°

2-trifluoromethyl-4-(4'-chloro-3 -trifluoromethyl-phenylthio)-5,7-dichloro-benzimidazole, M.P. 175°–177°

2-trifluoromethyl-5-phenylthio-6 -chlorobenzimidazole M.P. 222°–224°

2-trifluoromethyl-5-(3'-trifluoromethyl-4' -chlorophenoxy)-6-chloro-benzimidazole M.P. 263°–265°

2-trifluoromethyl-5-phenoxy-6-chloro-benzimidazole M.P. 205°–207°

2-trifluoromethyl-4-(4'-methoxyphenoxy)-5,7 -dichloro-benzimidazole M.P. 186°–188°

2-trifluoromethyl-4-(2',4',5'-trichlorophenoxy)-5,7-dichloro-benzimidazole M.P. 150°–152°

2-trifluoromethyl-5-(3',4'-dichlorophenoxy)-6-chloro-benzimidazole M.P. 238°–240°

2-trifluoromethyl-5-(3'-trifluoromethyl-4' -chloro-phenylthio)-6-chloro-benzimidazole M.P. 208°–210°

2-trifluoromethyl-5-(4'-chlorophenylthio)-6 -chloro-benzimidazole M.P. 212°–214°

2-trifluoromethyl-5-(2',4',5'-trichlorophenoxy)- 6-chloro-benzimidazole M.P. 225°–227°

2-trifluoromethyl-5-(2',5'-dichloro-phenylthio)- 6-chloro-benzimidazole M.P. 182°–184°

2-trifluoromethyl-5-(4'-chlorophenoxy)-6 -chloro-benzimidazole M.P. 191°–193°

2-trifluoromethyl-5-(4'-methoxy-phenoxy)-6 -chloro-benzimidazole M.P. 178°–180°

2-trifluoromethyl-5-(3'-trifluoromethyl-phenoxy)- 6-chloro-benzimidazole M.P. 191°–193°

2-trifluoromethyl-5-(4'-bromophenoxy)- 6-chloro-benzimidazole M.P. 196° – 198°

2-trifluoromethyl-4-(3',4'-dichloro-phenoxy)- 140° 5,6,7-trichloro-benzimidazole (decomposition)

2-trifluoromethyl-4-(3'-trifluoromethyl 4'-chloro-phenylsulfonyl)-5,6,7 -trichloro-benzimidazole M.P. 254° – 256°

Tests of the action of the new compounds on insects and spiders showed that these active substances are good to very good contact and stomach poisons and, at the same time they have a marked systemic action. A few benzimidazoles of the general formula VI have good herbicidal properties and can thus also be used for influencing plant growth.

It has been found that the compounds of the general formula VI have excellent protracted action on insects of the families Muscidae, Stomoxidae and Culicidae, e.g. the polyvalent resistant and normally sensitive house flies (*Musca domestica*), stable flies (*Stomoxys calcitrans*) and mosquitoes (e.g. *Aedes aegyptii*, Culex fatigans, Anopheles stephensi), on insects of the families Curculionidae, Bruchidae, Dermestidae, Tenebrionidae and Chrysomelidae, e.g. granary weevils (*Sitophilus granaria*), bean beetles (*Bruchidius obtectus*), larder beetles (*Dermestes vulpinus*), yellow meal worms (*Tenebrio molitor*), Colorado potato beetles (*Leptinotarsus decemlineata*) and their stages of development, on the Pyralididae family, e.g. Mediterranean flour moths (*Ephestia kuhniella*), the Blattidae family, e.g. German cockroaches (*Phyllodromia germanica*), the Aphididae family, e.g. bean aphids (*Aphis fabae*) and the Pseudococcidae family, e.g. citrus mealybugs (*Planococcus citri*). Tests on bean aphids (*Aphis fabae*) and desert locusts (*Schistocerca gregaria*) indicate that the substances have an excellent systemic action. They have also a good action against termites. The active substances of general formula VI can be used as insecticides for plant protection, protection of stores and for the protection of organic materials of all types. In addition, the active substances have a good action against the larval and adult stages of spiders, e.g. the Tetranychidae family.

As has already been said, the new benzimidazoles of general formula VI have an excellent insecticidal action against insects which destroy by eating, particularly against the larvae of insects which eat keratin fibers such as moth larvae, other small butterflies, fur and carpet beetles. The affinity of the active substances to the keratin fibers is excellent so that they are most suitable for the protection of crude and processed keratin material such as wool and other animal hair, wool textiles of all types, fells and furs, from injury by such insects. A good insecticidal protection is given to the treated materials by the active substances.

The insecticidal activity of 2-trifluoromethylbenzimidazoles is determined according to the same test as described in the foregoing paragraphs. The test results are given as follows:

| Compounds | Moths | Atta-genus | Anth-renus |
|---|---|---|---|
| 2-trifluoromethyl-4-phenoxy-5,7-dichlorobenzimidazole | ++++ | ++++ | ++++ |
| 2-trifluoromethyl-4-(2',4'-dichlorophenoxy)-5,7-dichlorobenzimidazole | ++++ | ++++ | ++++ |
| 2-trifluoromethyl-4-phenylthio-5,7-dichloro-benzimidazole | ++++ | ++++ | ++++ |
| 2-trifluoromethyl-4-(4'-chlorophenylthio)-5,7-dichloro-benzimidazole | ++++ | ++++ | ++++ |
| 2-trifluoromethyl-4-(4'-chlorophenoxy)-5,7-dichloro-benzimidazole | ++++ | ++++ | ++++ |
| 2-trifluoromethyl-4-(3'-chlorophenoxy)-5,7-dichloro-benzimidazole | ++++ | ++++ | ++++ |
| 2-trifluoromethyl-4-(4'-chloro-3-trifluoromethyl)-5,7-dichloro-benzimidazole | ++++ | ++++ | ++++ |
| 2-trifluoromethyl-4-(2',5'-dichlorophenylmercapto-5,7-dichloro-benzimidazole | ++++ | ++++ | ++++ |
| 2-trifluoromethyl-4-(4'-bromo-phenoxy)-5,7-dichloro-benzimidazole | ++++ | ++++ | ++++ |
| 2-trifluoromethyl-5-(phenyl-mercapto)-6-chloro-benzimidazole | ++++ | ++ | ++++ |
| 2-trifluoromethyl-4-(3'-trifluoromethylphenoxy)-5,7-dichloro-benzimidazole | ++++ | ++++ | ++++ |
| 2-trifluoromethyl-4-[4'-chloro-3'-trifluoromethyl)-phenyl-thio]-5,7-dichloro-benzimidazole | ++++ | ++++ | ++++ |
| 2-trifluoromethyl-5-(3-trifluoromethyl-4-chloro-phenoxy)-6-chloro-benzimidazole | ++++ | ++++ | ++++ |
| 2-trifluoromethyl-5-phenoxy-6-chloro-benzimidazole | ++++ | ++ | ++++ |
| 2-trifluoromethyl-4-(4'-methoxy-phenoxy)-5,7-dichloro-benzimidazole | ++++ | +++ | ++++ |
| 2-trifluoromethyl-4-(2',4',5'-trichlorophenoxy)-5,7-dichloro-benzimidazole | ++++ | ++++ | ++++ |
| 2-trifluoromethyl-5-(2',5'-dichlorophenylthio)-6-chloro-benzimidazole | ++++ | ++++ | ++++ |
| 2-trifluoromethyl-4-(3',4'-dichlorophenoxy)-5,7-dichloro-benzimidazole | ++++ | ++++ | ++++ |
| 2-trifluoromethyl-5-(3',4'-dichlorophenoxy)-5-chloro-benzimidazole | ++++ | ++++ | ++++ |
| 2-trifluoromethyl-5-(3'-trifluoromethyl-4'-chloro-phenylthio)-6-chloro-benzimidazole | ++++ | ++++ | ++++ |
| 2-trifluoromethyl-5-(4'-chlorophenylthio)-6-chloro-benzimidazole | ++++ | ++++ | ++++ |
| 2-trifluoromethyl-5-(2',4',5'-trichlorophenoxy)-6-chloro-benzimidazole | ++++ | ++++ | ++++ |

In the agar incorporation test worked out by Leonard and Blackford, (testing of bacteria and fungi on agar into which the active substances have been incorporated in various concentrations), the new benzimidazoles show an excellent prohibition of growth of micro-organisms such as bacteria, e.g. gram positive and gram negative bacteria, and fungi, e.g. *Aspergillus niger, Penicillium italicum, Fusarium oxysporum, Candida albicans, Acrostalagmus spec.* etc., so that they are particularly suitable for the protection of organic materials of all types from destruction and damage by bacteria and fungi. Keratin materials such as skins, leather, wool, as well as materials based on cellulose such as wood, cellulose, paper, cotton, also preparations such as pastes, printing thickeners made from starch and cellulose derivatives, oils of all types, treatment liquors for paper and textiles, plastics and synthetic materials of all types etc. are given not only insecticidal but also microbicidal protection by treatment with the new active substances.

The active substances to be used according to the invention can be used alone or combined with other known active substances. They can be combined, e.g. with halogenated salicylic acid alkylamides and alkylanilides, with halogenated diphenyl ureas, with halogenated phenoxydiphenyl ureas, with halogenated benzoxazoles or benzoxazolones, with 2-chloromethylsulphonylamino polychlorodiphenyl ethers, with polychlorohydroxydiphenyl methanes, with halogen dihydroxydiphenyl sulphides, with halogenated hydroxydiphenyl ethers, with bactericidal 2-imino-imidazolidines or 2-imino-tetrahydropyrimidines or with bactericidal quaternary compounds or with certain dithiocarbamic acid derivatives such as with tetramethyl thiuram disulfide. In admixture with synergists and auxiliaries having a similar action such as succinic acid dibutyl ester, piperonyl butoxide, olive oil, peanut oil etc., the insecticidal and acaricidal range of action of the active substances mentioned is widened and their action is improved. Also, the insecticidal action can be substantially improved, broadened and adapted to given circumstances by the addition of other insecticides such as phosphoric, phosphonic, thiophosphoric or dithiophosphoric acid esters and amides, other carbamic acid esters, halogenated hydrocarbons, DDT analogues, pyrethrins and synergists thereof.

The new active substances are applied in the form of solid or liquid agents such as dusts, sprinkling agents, granulates, aqueous dispersions which are obtained from wettable powders, pastes or emulsion concentrates, and also as solution or aerosol. For the protection of organic materials, the active substances are brought into the most finely distributed form as dispersions or solutions of active substance.

The agents according to the invention are produced in the known way by intimately mixing the active substances with solid or liquid carriers and distributing agents. For the protection of material, particularly organic solvents have proved valuable such as: propylene glycol, methoxyethanol, ethoxyethanol and dimethyl formamide. As distributing agents, emulsifying agents, e.g. sulfated castor oil, sulfite waste liquor and fatty alcohol sulfates can be used. The concentration of active substance in the agents is, e.g. 0.01 – 80 percent Also other biocidal active substances — for use in plant protection —also fertilizers and trace elements can be added to the agents according to the invention.

Keratin materials can be impregnated with the active substances by the most varied textile finishing processes such as hot or cold, aqueous dye, bleaching, chroming, pad dyeing or after-treatment baths. The new active substances are fixed excellently onto the keratin fiber not only by hot application but also by cold application. Even after cold application, the new active substances have high grade wet fastness properties, e.g. fastness to washing and milling.

Because of the solubility in organic solvents, the active substances are also well suitable for application from non-aqueous media. Here, the materials to be protected can simply be impregnated with the solution. With a suitable choice of solvent, the materials can be given an insecticidal and microbicidal finish also in a dry cleaning process.

Forms of compositions are described in the following text in which the active substances can be used in plant protection and for the protection of keratin materials.

Dust

To produce a 10 percent dust,
10 parts of 2-trifluoromethyl-4-phenoxy-5,7-dichlorobenzimidazole,
5 parts of highly dispersed silicic acid and
85 parts of talcum
are intimately mixed. Such a dust can be used, e.g. for combatting German cockroaches and ants.

Wettable powder

To produce (a) a 50 percent and (b) a 10 percent wettable powder, the following components are used:
a. 50 parts of 2-trifluoromethyl-4-(3'-trifluoromethyl-4'-chlorophenoxy)-5,7-dichloro-benzimidazole
5 parts of oleyl methyl tauride Na salt
2.5 parts of dinaphthalene methane disulphonic acid disodium salt
25 parts of lime/clay silicates
17.5 parts of kaolin.
b. 10 parts of 2-trifluoromethyl-6-(4'-chlorophenylsulfinyl)-5-chloro-benzimidazole
3 parts of a mixture of sodium salts of saturated fatty alcohol sulfonates (fatty alcohols = $C_8$—$C_{18}$)
5 parts of dinaphthalene methane disulphonic acid disodium salt
82 parts of kaolin.

The amounts of active substance mentioned are intimately mixed in suitable mixers with the additives and the mixture is milled in corresponding mills and drums. A wettable powder is obtained which can be diluted with water to form suspensions of any concentration desired. Such suspensions are mainly used for combatting insects in plant protection.

Emulsion concentrate

To produce (a) a 50 percent and (b) a 25 percent emulsion concentrate, the following components are mixed together:
a. 50 parts of 2-trifluoromethyl-4-(3',4'-dichlorophenoxy)-5,7-dichloro-benzimidazole
17.5 parts of 2-methoxyethanol
22.5 parts of xylene
8 parts of nonylphenol/polyglycol ether condensate
2 parts of dodecyl benzene sulfonate calcium salt.
b. 10 parts of 2-trifluoromethyl-4-(4'-bromophenoxy)-5,7-dichloro-benzimidazole
25 parts of diacetonyl alcohol
2 parts of alkylaryl polyglycol ether
3 parts of a combination emulsifying agent (nonylphenol-polyoxyethylene-dodecyl benzene sulfonic acid calcium salt)
60 parts of xylene.

These concentrates can be diluted with water to form emulsions of any concentration desired. Such emulsions are used, e.g. to combat insects in plant protection and the protection of stores.

Paste

To produce a 45 percent paste, the following substances are used:
45 parts of 2-trifluoromethyl-2-(4'-chlorophenylsulfonyl)-5,7-dichloro-benzimidazole,
5 parts of sodium aluminum silicate
14 parts of cetyl polyglycol ether (condensate from saturated $C_8$ – $C_{18}$ fatty alcohols and 8 mols of ethylene oxide)
1 part of oleyl polyglycol ether (oleyl alcohol + 5 mols of ethylene oxide condensate)
2 parts of spindle oil
10 parts of polyethylene glycol ether ("Carbowax")
23 parts of water.

The active substance and the additives are intimately mixed and milled in suitable apparatus. A paste is obtained from which, by dilution with water, suspensions of any desired concentration can be produced.

Agents according to the invention for combatting insect larvae which injure keratin fibers and the use of these agents for the protection of keratin materials from injury by such pests are further illustrated in the following examples. Parts are given therein as parts by weight and the temperatures are given in degrees Centigrade.

EXAMPLE I 0.5 Parts of 2-trifluoromethyl-4-(3',4'-dichlorophenoxy)-5,7-dichloro-benzimidazole, in the form of the sodium salt, are dissolved with the help of 10 parts of 0.1 N sodium hydroxide solution and a little ethanol. This solution is diluted with 3,000 parts of water and 100 parts of wool are treated in this liquor for 15 minutes at 60°. 5 Parts of 10 percent acetic acid are then added and the treatment is continued for another hour at 60°. The wool is then rinsed and dried in the usual way. It proves, on testing, to be resistent to attack by moth, fur beetle and carpet beetle larvae.

EXAMPLE II

First, a 20 percent solution of 2-trifluoromethyl-4-(3',4'-dichlorophenoxy)-5,7-dichloro-benzimidazole in glycol monomethyl ether is produced. 10 parts by volume of this solution are diluted with 200 parts by volume of a solvent suitable for dry cleaning, e.g. a suitable benzine fraction ("-Diluan S"). If desired, additives which promote cleansing can be added. The woollen articles are then treated in the usual way in this cleaning liquor and then centrifuged to a solvent content of about 100 percent of the weight of the wool. After drying, they prove to be mothproof.

In an analogous manner, the same baths or those of analogous composition can also be used for mothproofing untreated articles or articles which have already been treated in some way or cleaned.

Similar mixtures can also be used for sprinkling on or spraying wool in any stage of processing.

EXAMPLE III

To apply 2-trifluoromethyl-4-(3',4'-dichlorophenoxy)-5,7-dichloro-benzimidazole, the following process, for example, can be used:

0.5 Parts of active substance are dissolved in 10 parts of dimethyl formamide and the solution is poured into 3,000 parts of water containing about 1 — 2 parts of an emulsifying agent, e.g. sulfated castor oil.

100 Parts of wool are treated in this liquor at the boiling temperature for 30 minutes. After rinsing and drying, the wool proves to be mothproof.

Naturally, other auxiliaries and also dyestuffs can be added to the treatment baths in examples I and II.

We claim:
1. A compound selected from a benzimidazole of the formula

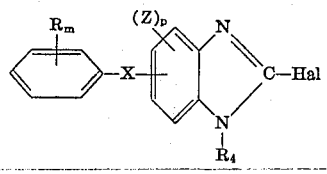

wherein
R is hydrogen, halogen, or trifluoromethyl;
Hal is halogen;
$R_4$ is hydrogen or an alkali metal cation;
X is oxygen, sulfur, sulfinyl, or sulfonyl;
Z is halogen, nitro, alkyl of up to six carbon atoms, alkoxy of up to six carbon atoms, alkylthio of up to six carbon atoms, trifluoromethyl, lower alkyl-substituted amino, benzoylamino, halogeno benzoylamino, trifluoromethyl benzoylamino, benzene sulfonylamino, alkylsulfonylamino, alkylsulfinyl, alkylsulfonyl, trifluoromethyl benzenesulfonylamino, trifluoromethyl halogeno benzenesulfonylamino, or sulfo,
m is an integer of from 1 to 5; and
p is an integer of from 0 to 3.
2. A compound selected from a benzimidazole of the formula

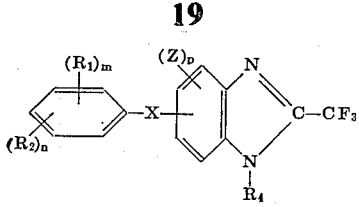

wherein
R₁ is halogen with an atomic number of at most 35, or halogeno lower-alkyl;
R₂ is halogen with an atomic number of at most 35, lower alkyl, lower alkoxy, lower alkylthio, lower alkyl sulfinyl or lower alkyl sulfonyl;
Z is halogen with an atomic number of at most 35;
R₄ is hydrogen, or an alkali metal cation;
X is oxygen, sulfur, sulfinyl, or sulfonyl;
m is an integer of from 0 to 3;
n is an integer of from 0 to 2; and
p is an integer of from 1 to 3.

3. A compound as defined in claim 2 wherein said benzimidazole is 2-trifluoromethyl-4-(3',4'-dichlorophenoxy)-5,7-dichloro benzimidazole.

4. A compound as defined in claim 2 wherein said benzimidazole is 2-trifluoromethyl-4-phenoxy-5,7-dichloro benzimidazole.

5. A compound as defined in claim 2 wherein said benzimidazole is 2-trifluoromethyl-4-(3'-trifluoromethyl-4'-chlorophenoxy)-5,7-dichloro benzimidazole.

6. A compound as defined in claim 2 wherein said benzimidazole is 2-trifluoromethyl-6-(4'-chlorophenylsulfinyl)-5-chloro benzimidazole.

7. A compound as defined in claim 2 wherein said benzimidazole is 2-trifluoromethyl-4-(4'-chlorophenylsulfonyl)-5,7-dichloro benzimidazole.

8. A compound according to claim 1, wherein p is an integer from 1 to 3, and each Z is halogen.

9. A compound as claimed in claim 2 which is 2-trifluoromethyl-4-(2',4',5'5,7-dichloro-benzimidazole.

* * * * *

UNITED STATES PATENT OFFICE
CERTIFICATE OF CORRECTION

Patent No. 3,673,209          Dated June 27, 1972

Inventor(s) Wilhelm Ernst Frick, Anton G. Weiss, Thomas Wenger

It is certified that error appears in the above-identified patent and that said Letters Patent are hereby corrected as shown below:

Abstract, in the second structure, change "$(R_i)m$" to -- $(R_1)m$ --.

Column 2, line 24, change "Bechamp's a method" to -- Bechamp's method --.

Column 3, line 12, change "Anthronus" to -- Anthrenus --.

Column 4, line 69, change "or the" to -- ortho --.

Column 10, line 17, change "phenoxy" to -- trichlorophenoxy --.

Column 10, line 67, change "(2',4',5'" to -- (2',4',5'trichlorobenzoyl --.

Column 12, line 2, change "collosolve" to -- cellosolve --.

Column 13, line 30, change "M.P. 194°-**°" to -- M.P. 194°-196° --

Column 20, Claim 9, lines 19 and 20, change "(2',4',5',5,7-dichlorobenzimidazole" to -- (2',4',5',-trichlorophenoxy)-5,7-dichlorobenzimidazole --.

Signed and Sealed this

Seventh Day of September 1976

[SEAL]

Attest:

RUTH C. MASON
*Attesting Officer*

C. MARSHALL DANN
*Commissioner of Patents and Trademarks*